United States Patent [19]

Fujii

[11] Patent Number: 5,315,295
[45] Date of Patent: May 24, 1994

[54] VEHICLE SPEED CONTROL SYSTEM

[75] Inventor: Yutaka Fujii, Hiroshima, Japan

[73] Assignee: Mazda Motor Corporation, Hiroshima, Japan

[21] Appl. No.: 822,285

[22] Filed: Jan. 21, 1992

[30] Foreign Application Priority Data

Jan. 18, 1991 [JP] Japan .................................. 3-004590

[51] Int. Cl.⁵ .......................................... G08G 1/01
[52] U.S. Cl. .................................. 340/936; 340/905; 340/995; 340/990; 340/988; 340/435
[58] Field of Search ............... 340/936, 905, 995, 990, 340/988, 435

[56] References Cited

U.S. PATENT DOCUMENTS

| | | | |
|---|---|---|---|
| 3,921,749 | 11/1975 | Kawada | 340/435 |
| 4,937,570 | 6/1990 | Matsukawa et al. | 340/905 |
| 4,986,384 | 1/1991 | Okamoto et al. | 340/435 |
| 5,067,082 | 11/1991 | Nimura et al. | 340/988 |
| 5,089,826 | 2/1992 | Yano et al. | 340/995 |
| 5,093,669 | 3/1992 | Kajiyama | 340/995 |
| 5,119,301 | 6/1992 | Shimizu et al. | 340/995 |
| 5,146,219 | 9/1992 | Zechnall | 340/995 |

FOREIGN PATENT DOCUMENTS

| | | |
|---|---|---|
| 3122901 | 12/1982 | Fed. Rep. of Germany . |
| 3819215 | 12/1989 | Fed. Rep. of Germany . |
| 57-155700 | 9/1982 | Japan . |

OTHER PUBLICATIONS

Thoone, M. L. G.; "Carin, A Car Information and Navigation System"; Philips Technical Review, vol. 43, No. 11/12. Dec. 1987; pp. 317-329.
DE-Z Funkschau: "Die Elektronischen Beifahrer"; Heft May 1988, S. 46-48.

Primary Examiner—John K. Peng
Assistant Examiner—Nina Tong
Attorney, Agent, or Firm—Keck, Mahin & Cate

[57] ABSTRACT

A vehicle speed control system for a vehicle is used, with a vehicle navigation system, for indicating a location of the vehicle on a road map as the vehicle travels and for providing information related to the road, including curves of the road. The vehicle speed control system receives information related to curves of a road on which the vehicle travels, such as the radius of curvature, when the vehicle navigation system indicates that the vehicle location is before the curve. The system calculates a limit vehicle speed, at which the vehicle can negotiate and pass safely through the curve, based on the vehicle speed and the radius of curvature of the curve. When the vehicle speed is higher than the limit vehicle speed, the vehicle speed control system provides a warning and/or automatically brakes the vehicle, or automatically closes a throttle of the vehicle, so as to lower cause the vehicle speed to fall below the limit vehicle speed.

12 Claims, 9 Drawing Sheets

VEHICLE SPEED CONTROL SYSTEM

BACKGROUND OF THE INVENTION

1. Field of the Invention

The present invention relates to a navigation system for automotive vehicles and, more particularly, to an automotive vehicle navigation system which controls vehicle speed as the vehicle makes a turn.

In return years, various kinds of automatically controlled electronic driving systems have been developed which enable drivers to drive, safely and comfortably, independently of their particular feelings and driving techniques. For example, it is known to have vehicle distance control systems automatically decelerate an automotive vehicle, as well as provide an alarm, when the automotive vehicle is closer to a leading vehicle than a safe distance corresponding to a vehicle speed at which the automotive vehicle travels. Such a vehicle distance control system is known from, for instance, Japanese Unexamined Patent Publication No. 57(1982)-155,700. The vehicle distance control system in the publication mentioned above detects its own vehicle speed and the distance between a leading vehicle and compares the distance with what is considered a safe distance corresponding to the vehicle speed.

2. Description of the Related Art

For safe driving, vehicles must be controlled to be held at a safety speed which depend on road conditions as well as the distance between two vehicles. As an example, in negotiating a sharp turn, when a vehicle, traveling on a straightway at a relatively high speed, enters into a sharp turn, it should be brought down to a proper approaching speed, lower than the traveling speed, corresponding to a radius of the sharp turn before an approach point of the turn. If the vehicle enters into the sharp turn at a speed higher than the proper approaching speed, it possibly will swerve from the sharp turn, due to a centrifugal force which is proportional to the radius of the turn and varies inversely with the square of vehicle speed. However, if a turn in the vehicle path is not visible, it is difficult to estimate the radius of the turn. Moreover, although a turn in the path may be visible enough to estimate the radius of the turn, if the path is icy or wet, safe driving is assured only when a vehicle enters into the turn at a speed lower than a speed visually estimated corresponding to the radius of the turn. Such a radius and speed estimation is hard to make accurately and quickly during driving.

SUMMARY OF THE INVENTION

It is an object of the present invention to provide a vehicle speed control system for a vehicle which automatically controls vehicle speed when the vehicle enters into a curve.

This object is accomplished by providing a vehicle speed control system for a vehicle which is assisted by a vehicle navigation system for indicating a location of the vehicle on a road map displayed on a screen as the vehicle travels and which provides information relating to the road, including information relating to curves in the road. The vehicle speed control system receives information relating to a curve in the road on which the vehicle is traveling, such as the radius of curvature of the road, when the vehicle navigation system indicates that the vehicle located on the road and is approaching the curve. The system calculates a limit vehicle speed, at which the vehicle can negotiate and pass safely through the curve, based on the vehicle speed and the radius of curvature of the curve. When the vehicle speed is higher than the limit vehicle speed, the vehicle speed control system provides a warning and/or automatically brakes the vehicle or automatically closes a throttle of the vehicle so as to lower the vehicle speed below the limit vehicle speed.

BRIEF DESCRIPTION OF THE DRAWINGS

The above and other objects of the present invention will be apparent to those skilled in the art from the following description of preferred embodiments thereof when considered in conjunction with the appended drawings, in which similar reference numerals have been used to designate similar or the same elements throughout the drawings, and wherein.

DETAILED DESCRIPTION OF THE PREFERRED EMBODIMENTS

Figure 1:
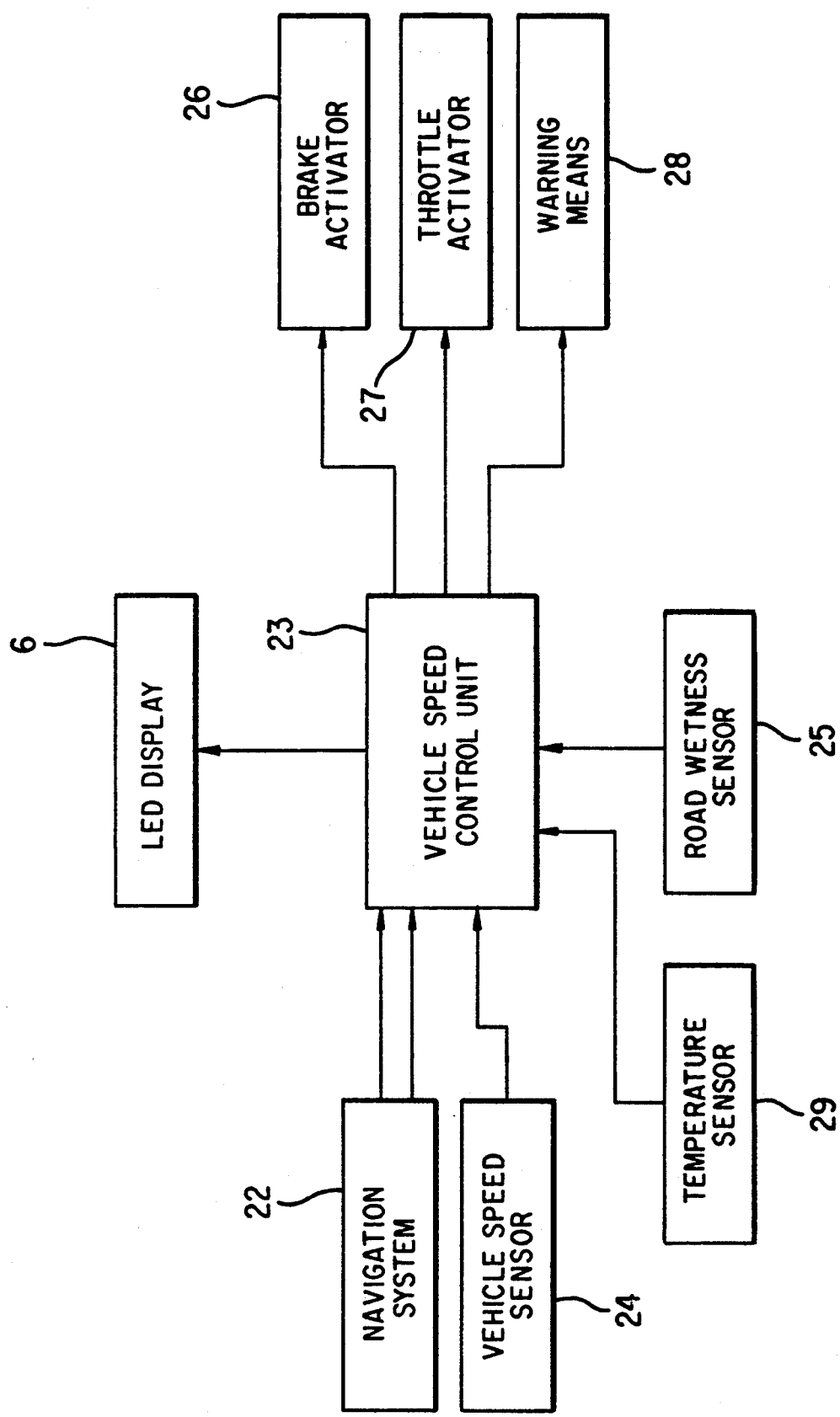
FIG. 1 is a block diagram showing a vehicle speed control system in accordance with a preferred embodiment of the invention.

Referring to the drawings in detail and, in particular to FIG. 1, a vehicle speed control system in accordance with a preferred embodiment of the invention, which cooperates with a vehicle navigation system, is shown as having a vehicle control unit 23. The vehicle speed control unit 23 receives signals representative of road conditions, such as road temperature and wetness, and vehicle speed. Such signals are provided by a temperature sensor 29, a wetness sensor 25 and a speed sensor 24. The vehicle speed control unit 23 further receives signals from a vehicle navigation system 22 so as to display necessary road information, for guiding the vehicle to a desired destination, on a display screen 6. The display screen 6 may be a liquid crystal display device, installed in an instrument panel of the vehicle. Based on the signals and information from the sensors 24, 25 and 29 and the vehicle navigation system 22, the vehicle speed control unit 23 operates various elements, such as a brake activator 26, a throttle valve activator 27 and a warning means to be described.

Figure 2:
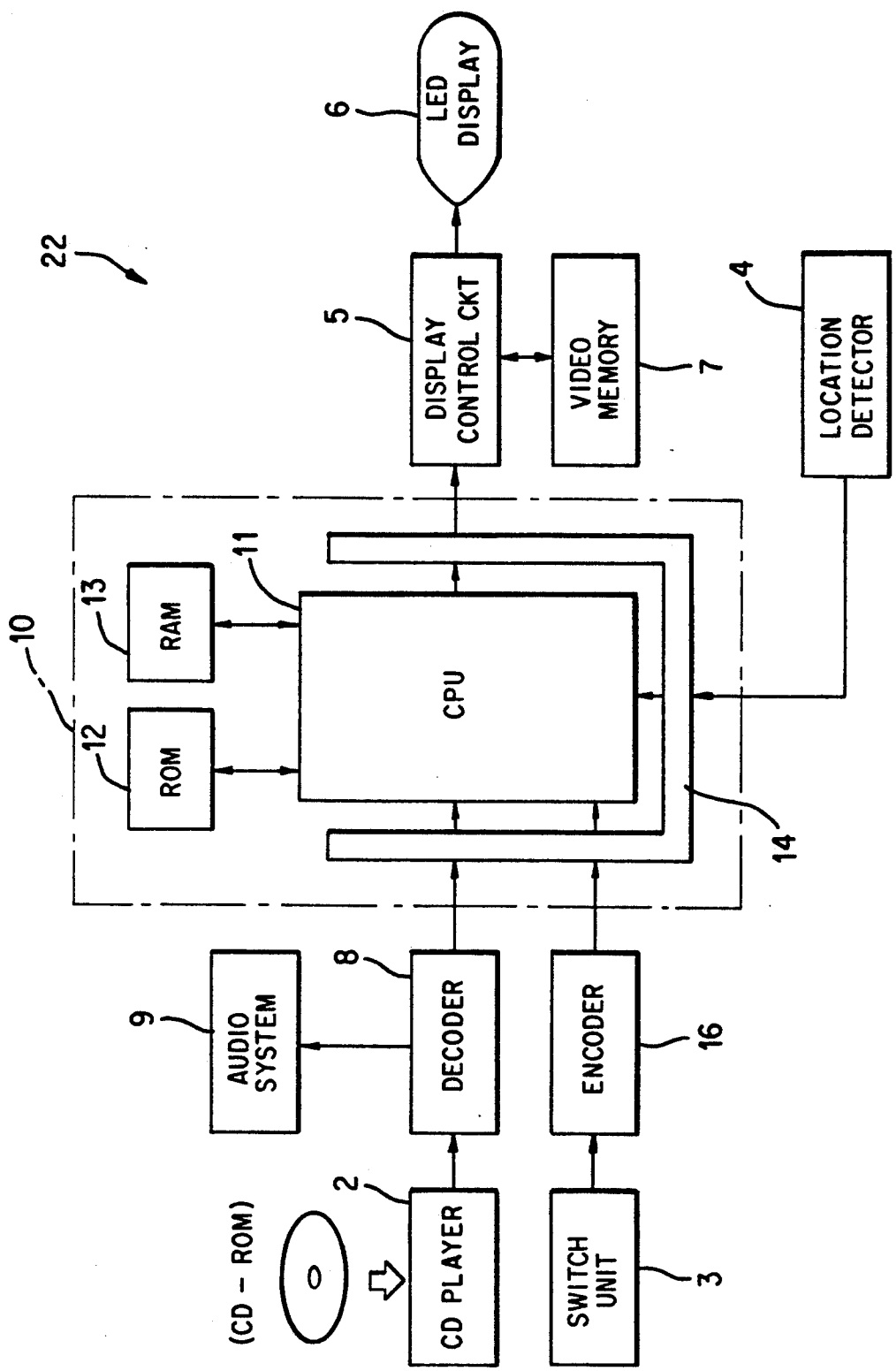
FIG. 2 is a block diagram showing a vehicle navigation system using a global positioning satellite system for use with the vehicle speed control system of FIG. 1.

The vehicle navigation system 22 shown in FIG. 2 utilizes what is called a "Grovel Positioning System," in which various position data is sent by a satellite. The vehicle navigation system 22 has a navigation control unit 10, which includes a central processing unit (CPU) 11, a read only memory (ROM) 12 for carrying a control program, and a random access memory (RAM) 13 for storing various control data. CPU 11 is connected by means of an interface 14 to various external units, which will be described later, so as to exchange information therebetween. As external units connected to the navigation control unit 10, there are provided, in the vehicle, a compact disk player 2, a command switch unit 3, a vehicle location detector 4, a liquid crystal display 6, and an audio unit 9. The compact disk player 2, connected to the navigation control unit 10 by way of a decoder 8, drives a compact disk (CD-ROM) 1 as a read only memory in which a great number of road maps, reduced to different sizes, are stored, and accesses the compact disk (CD-ROM) 1 at a specified address in terms of latitude X and longitude Y so as to read out a desired one of the road maps from the compact disk (CD-ROM) 1 and send the data representative of the desired road map, to the central processing unit (CPU) 11 through the decoder 8 and the interface 14 and to the audio unit 9. The data input into the central processing unit (CPU) 11 is temporarily stored in the random access memory (RAM) 13. The command switch unit 3, connected to the navigation control unit 10 by way of an encoder 16, is used to set, reset and change a destination, change a desired route, and change demands for displaying a map therethrough. The audio unit or system 9 is connected to the compact disk player 2 by way of the decoder 8 and includes an amplifier, an icorizer, a speaker, etc. The liquid crystal display 6 is connected to the navigation control unit 10 by way of a display drive circuit 5 with a video memory 7. The display 6 displays an video image of a map read out by the compact disk player 2 from the compact disk (CD-ROM) 1. The vehicle location detector 4, connected directly to navigation control unit 10, detects a spot Pn in the terms of latitude Xn and longitude Yn at which the vehicle is presently located.

In the compact disk (CD-ROM) 1, there is stored data representative of details of, for instance, about 30,000 pieces of color road maps, which form 15,000 sets of color road maps. Each set of maps is reduced to a different size. Road map data includes road details, such as radii of curves, bends, turns and the like, as well as color images.

Display switching unit 3, which may be of an on-screen switching type, or any other well known type, has various switch functions. These functions include menu display, information display, destination re-setting, enlarged map display, normal-size map display, spot display and correction. Instructions, entered through the display switching unit 3, are coded through the encoder 6, and then transmitted to the central processing unit (CPU) 11 of the navigation control unit 10 through the interface 14. According to the instructions entered the central processing unit (CPU) 11 performs necessary processing so as to cause the display drive circuit 5 to display an image on the liquid crystal display 6.

Figure 3:
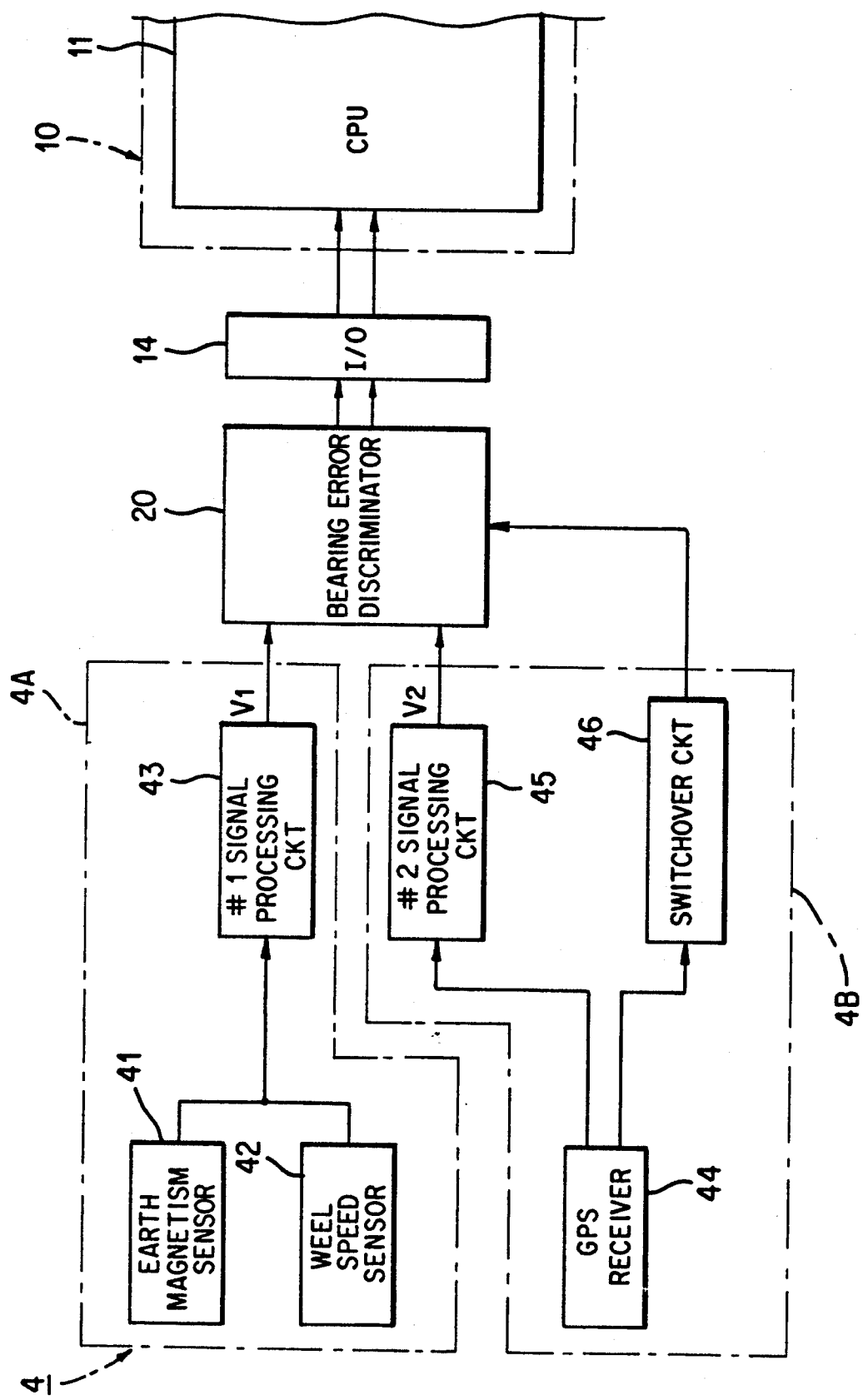
FIG. 3 is a block diagram showing a vehicle location detecting means.

Vehicle location detector 4, as is shown in detail in FIG. 3, has an extrapolation navigational system as a first location detecting means 4A, which uses earth magnetism, and a grovel positioning navigational system as a second location detecting means 4B. The first location detecting means 4A includes, for instance a terrestrial or earth magnetism sensor 41, such as a flux gate, for detecting terrestrial magnetism of a place which the vehicle is traveling, a vehicle speed sensor 42 for detecting a revolution speed of a wheel from which a vehicle speed and a traveled distance are found, and a processing circuit 43. Operation of the processing circuit 43 will be described in detail later in conjunction with FIG. 4. The first location detecting means 4A determines a point Pn, in terms of latitude Xn and longitude Yn, at which the vehicle is presently located, by obtaining a distance D from a reference point Po(Xo, Yo) and a direction of the vehicle. A location of one point relative to another point can be easily found from an exact distance between the two points and a direction in which the one point is oriented.

Figure 4:
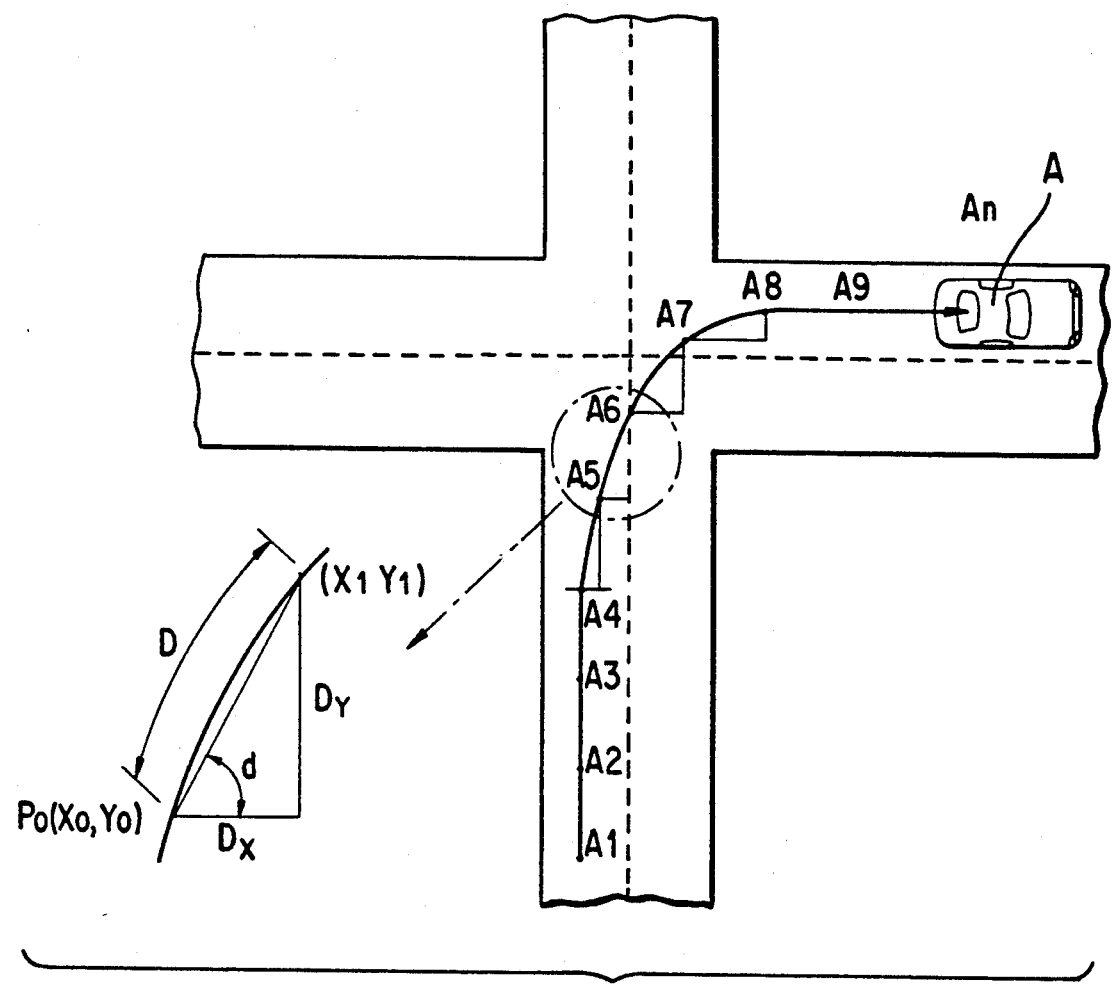
FIGS. 4 and 5 are illustrations of the principles involved in finding the vehicle location.

In order to understand the fundamental principle of involved in finding a location of one point relative to another point, a vehicle A traveling from a point A1 is considered. The location of the point A1 is considered as a starting or reference point Po, and another point An to which the vehicle is traveling, is considered to be a destination point Pn. The vehicle travels through points A2, A3, ..., A9, as shown in FIG. 4, and a direction (d) is detected by the terrestrial magnetism sensor 41 after every specified distance (A1-A2, A2-A3, A3-A4, ..., A9-An) of, for instance 5m, has been traveled. The specified distance is found from the number of wheel revolutions detected by the vehicle speed sensor 42. Based on the distance (D) and direction (d) of each point A2, A3, ..., An, relative to a previous point, coordinate transformation is performed to find the coordinates of the point in an orthogonal coordinate system. In such a system, the east-west direction is determined to be the X coordinate axis and the north-south direction is determined to be the Y axis. Then, a distance Dx between each pair of two adjacent points in the east-west direction is calculated from the equation, $Dx = D\cos d$. Similarly, a distance Dy between each pair of two adjacent points in the north-south direction is calculated from the equation, $Dy = D\sin d$. The coordinates (Anx, Any) of the point An are obtained by adding the distances Dx and the distances Dy, respectively. In this way, the coordinates (Px, Py) of a destination point Pn are determined.

Figure 5:
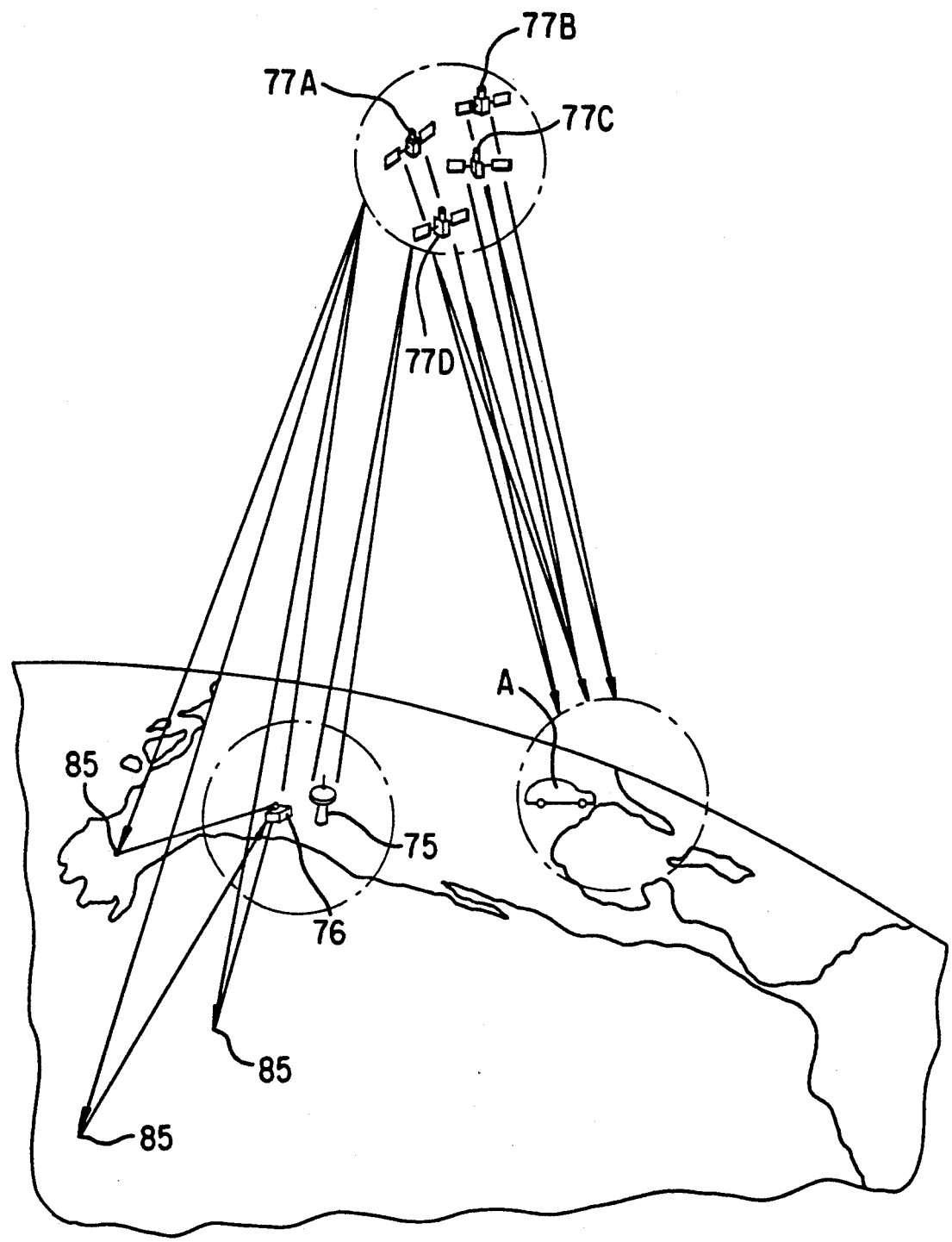

Second location detecting means 4B cooperates with a global positioning satellite system (GPSS), shown in FIG. 5, which has been put to practical use. The global positioning satellite system comprises a ground control station 76 providing radio waves through a ground station antenna 75, at least four, desirably 18, global positioning system satellites 77A-77D for receiving the radio waves and a ground monitor station 85 for monitoring radio waves from the global positioning system satellites 77A-77D so as to operate direction or bearing error coefficients (GDPO) which indicated the magnitude of bearing errors of the radio waves from the global positioning system satellites 77A-77D. The bearing error coefficients (GDPO) are superimposed upon the radio waves from the ground control station 76.

As is shown in FIG. 3, the second location detecting means 4B of the vehicle A comprises a radio wave receiving circuit 44, a second signal processing circuit 45 and a bearing error coefficient deciding circuit 46. The second signal processing circuit 45 detects distances between the global positioning system satellites 77A-77D and the vehicle A, an altitude of the vehicle A and a time, based on radio waves from the global positioning system satellites 77A-77D, which are received by the radio wave receiving circuit 44, to find an absolute location Pn of the vehicle at present. The bearing error coefficient deciding circuit 46 provides bearing error signals when the bearing error coefficients of the radio waves from the global positioning system satellites 77A-77D are smaller than a predetermined value, due, for instance, to an improper arrangement of the global positioning system satellites 77A-77D and/or insufficient field strength of the radio waves received by the radio wave receiving circuit 44. Such an insufficient field strength may be caused, for instance, when the vehicle A is in a tunnel. Bearing error coefficients are classified into, for instance, four grades, represented by four degrees of bearing error signals, namely, a smallest degree, 0, a medium small degree 1, a medium large degree 2 and the largest degree 3.

Changeover circuit 20 selects the second location detecting means 4B when larger degrees of bearing error signals 2 and 3 are not provided by the bearing error coefficient deciding circuit 46. The changeover circuit 20 selects the first location detecting means 4A when larger altitudes of bearing error signals 2 and 3 are provided by the bearing error coefficient deciding circuit 46. Information related to a vehicle location, provided by the selected location detecting means, is transmitted to the central processing unit 11 of the navigation control unit 10. The selection of the location detecting means by the changeover circuit 20 is effected only when map-matching (which will be described later) is not introduced.

Generally, positioning errors, the degrees of which depend upon the accuracy of positioning methods, unavoidably occur. Because such positioning errors accumulate, particularly when relying upon an extrapolation type navigational system, a location of the vehicle may possibly be indicated incorrectly; the vehicle may be determined to be road of a displayed road map which is different from a road on which the vehicle is actually traveling. For this reason, the navigation system, with which the vehicle control system cooperates, performs what is called "map-matching" to correctly indicate a location of the vehicle on a road of the road map which has the largest provability that the vehicle is actually traveling on the road. The map-matching is performed every time the vehicle has traveled over a predetermined distance or for a predetermined time so as to correct a vehicle location indication error. In order to introduce the map-matching, all roads near the vehicle are listed or called up and information related to the roads are read out from the RAM 13 so as to evaluate the probability that the vehicle is actually traveling on each road. A map-matching program is carried in the central processing unit 11. During the performance of map-matching, the changeover circuit 20 selects both the first and second location detecting means 4A and 4B so as to send vehicle location information to the central processing unit 11. The vehicle location information is selectively used according to the altitudes 0, 1, 2 and 3, of bearing error signals so as to perform stable map-matching. The navigation control unit 10 guides the vehicle so that it always follows a "most proper" path. The most proper path is based on a relationship between a preset destination Pend and an actual vehicle location Pn recognized and indicated on a road map displayed on the display screen 6.

Figure 6:
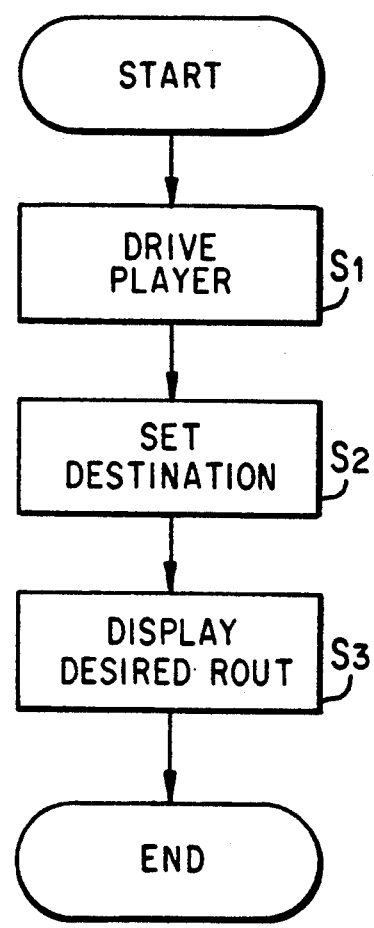
FIG. 6 is a flow chart illustrating a sequential operation of the vehicle navigation system of FIG. 2.

Referring to FIG. 6, which is a flow chart illustrating a proper path selection and a vehicle location display routine, the first operation at step S1 is to set a compact disk (CD-ROM) 1 in the CD player 2 and drive the CD player 2 so as to make road map information ready to be read out. Before starting the vehicle A, a destination point Pend is entered, through the command switch unit 3, and the vehicle location detector 4 is activated to read a start point Po(Xo, Yo) into the RAM 13 at step S2. Thereafter, a desirable path between the start point Po and the destination point Pend is set and a road map, including the start point and a road along the desired path, is displayed on the display screen 6. As the vehicle travels, the navigation system 22 marks correctly a vehicle location, detected by the first and second location detecting means 4A and 4B, on the road map, performing map-matching.

Figure 8:
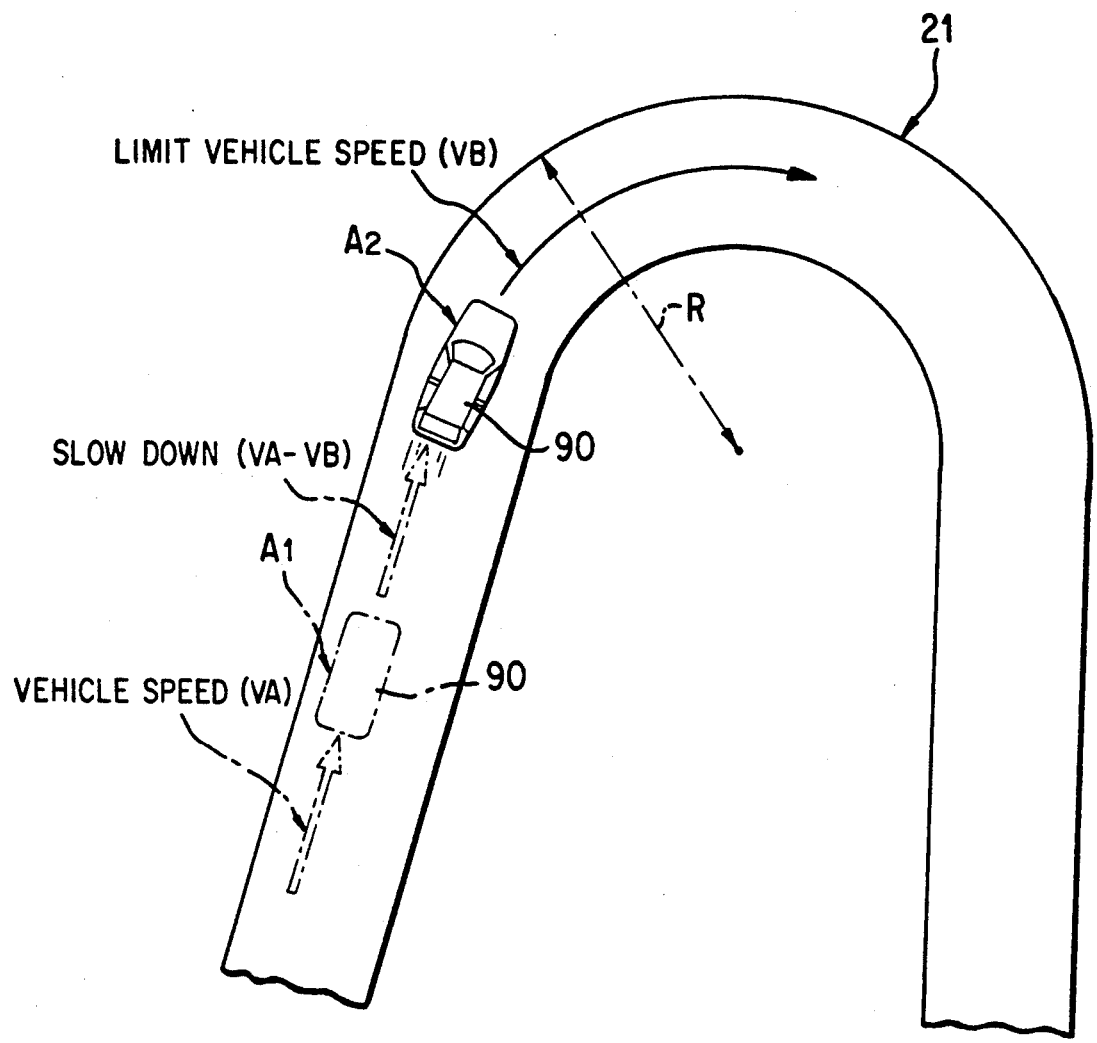
FIG. 8 is an illustration of the operation of the vehicle speed control system of FIG. 1.

Generally speaking, when approaching a sharp bend or curve 21 having a small radius of curvature R, as illustrated in FIG. 8, on the way to the destination point Pend, the vehicle 90 must start to decelerate or slow its speed down to a proper limit vehicle speed VB at a proper point A1 before the sharp curve 21. This allows the vehicle to enter safely into the sharp curve 21. After cornering and safely negotiating the sharp curve 21, the vehicle 90 accelerates or speeds up near an outlet of the curve 21 and exits the curve 21. This is a fundamental driving pattern referred to as a "slow-in, fast-out" pattern. However, if a sharp bend or curve has a small radius of curvature and is slippery or icy, it is difficult for the vehicle to safely go around the curve and there is a danger that the vehicle will travel out of the curve. For this reason, the vehicle 90 should slow down to a proper limit vehicle speed VB determined according to the radius of curvature of the bend or curve of the road and road conditions. However, if a curve is hidden from view, it is difficult to determine, even roughly, the radius of curvature of the curve, so as to make it difficult to estimate a proper and safe speed for the curve.

Referring again to FIG. 1, the navigation system 22 reads out information related to a radius of curvature R of a curve of a road according to a traveling location Pn detected by the vehicle location detector 4 and sends it to the vehicle speed control unit 23. Simultaneously, the vehicle speed control unit 23 receives signals, representative of road conditions, such as a road temperature T and a road wetness W, and vehicle speed VA. Such signals are provided by a temperature sensor 29, a wetness sensor 25 and a speed sensor 24. Based on all of the signals and information about the road and the curve, the vehicle speed control unit 23 calculates a limit vehicle speed VB at or below which the vehicle can safely enter into and exit from the curve. If an actual vehicle speed VA is higher than the limit vehicle speed VB the vehicle speed control unit provides a warning to the driver through the warning means 28, or otherwise causes the brake activator 26 or the throttle activator 27 to forcibly slow down the vehicle speed VA automatically to the limit vehicle speed VB.

Figure 7:
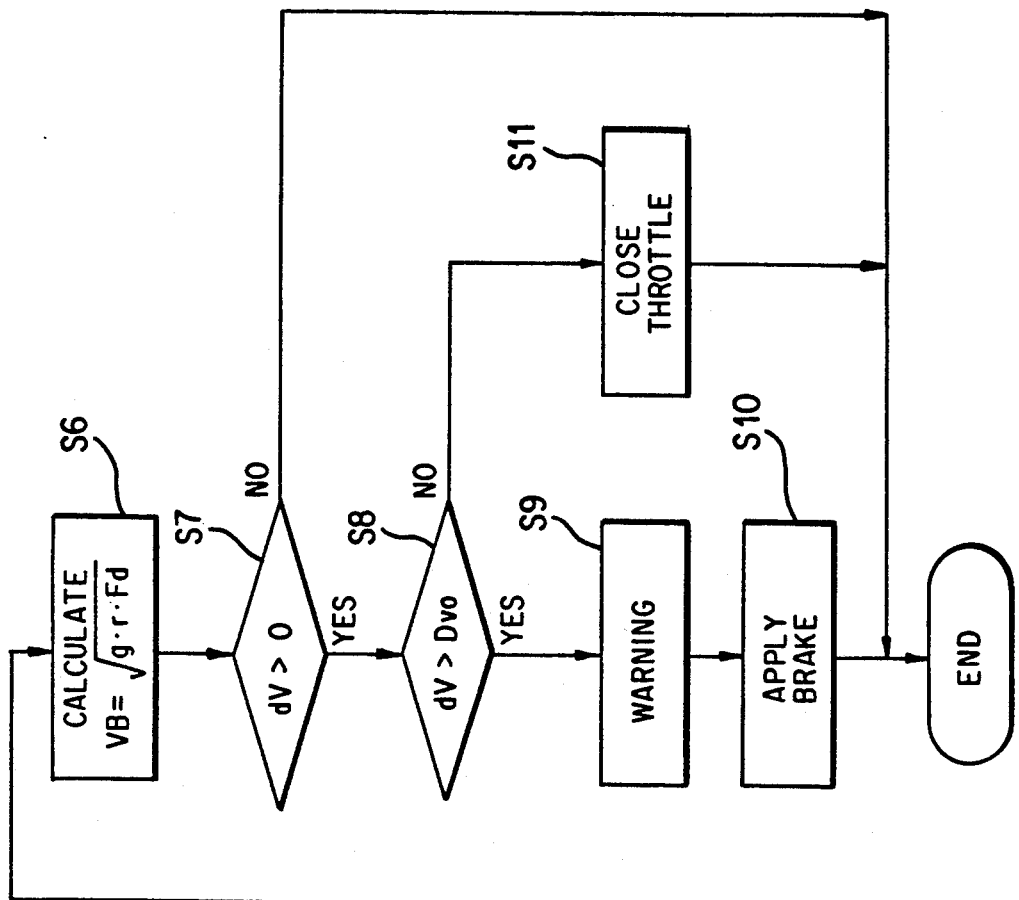
FIG. 7 is a flow chart illustrating a vehicle speed control sequence of the vehicle speed control system of FIG. 1.

The operation of the vehicle speed control system is best understood by reviewing FIG. 7, which is a flow chart illustrating a vehicle speed control sequence. Programming a computer is a skill well understood in the art. The following description is written to enable a programmer having ordinary skill in the art to prepare an appropriate program. The particular details of any such program would, of course, depend upon the architecture of the particular computer selected.

The first operation at step S1 is to input data representative of a vehicle location Pn (point A1 in FIG. 8), at which the vehicle is at present, and data representative of a radius of curvature R of a curve 21, which the vehicle is approaching from the vehicle location Pn, into the vehicle speed control unit 23 from the vehicle navigation system 22. The vehicle speed control unit 23, after indicating at step S2 that the vehicle approaches a curve, receives a signal, representative of the actual speed of vehicle VA, from the speed sensor 24 and data representative of frictional drag Fdo of the road surface, from the vehicle navigation system 22 at step S3. Almost simultaneously, the vehicle speed control unit 23 receives signals, representative of the road temperature T and the road wetness W, from the temperature sensor 29 and the wetness sensor 25, respectively, at step S4. Based on the temperature of road T and the wetness of road W, and the frictional road drag Fdo, the grade of practical frictional drag Fd is read out from a frictional drag map. In the map, frictional drags are classified into, for instance, three grades of practical substantial frictional drags Fd1, Fd2 and Fd3 in terms of road temperature T and road wetness W, road frictional drag Fdo.

Then, at step S6, a limit vehicle speed VB is calculated from the following equation:

$$VB = \sqrt{g \cdot R \cdot Fd}$$

That is, when a vehicle approaches a curve 21 having a radius of curvature R, at a speed VB an angular velocity w is expressed as follows:

$$w = VB/R$$

Using g and m for the gravitational acceleration and the weight of the vehicle 90, respectively, when the vehicle 90, which is traveling at the vehicle speed VB at a point A2, is dynamically balanced, the following equation is satisfied:

$$Fd \cdot m \cdot g = m \cdot R \cdot (VB/R)^2$$

Solving the equation for VB:

$$VB = \sqrt{g \cdot R \cdot Fd}$$

If the vehicle travels at the limit vehicle speed VB, determined according to the radius of curvature R and road conditions of the curve 21, the vehicle will pass safely through the curve 21.

At step S7, a decision is made as to whether or not a vehicle speed deviation dV, which is the difference between the actual vehicle speed VA and the limit vehicle speed VB, is still positive. If the answer to this decision is no, this indicates that the vehicle 90 has slowed down below the limit vehicle speed VB before it enters the curve 21, then, the vehicle 90 is allowed to continuously travel at the vehicle speed VA. If the answer to the decision is yes, this indicates that the vehicle 90 must be decelerated. Then another decision is made at step S8 as to whether or not the vehicle speed deviation dV is larger than a predetermined speed deviation dVo. The predetermined speed deviation dVo has been set so as to be cancelled only by closing a throttle valve of the engine. If the answer to the decision made at step S8 is no, this indicates that the vehicle speed VA has been lowered below the limit vehicle speed VB only by closing the throttle. Then, the vehicle speed control unit 23 causes the throttle activator 27 to close the throttle valve at step S11. On the other hand, if the answer to the decision made at step S8 is yes, this indicates that closing the throttle valve can not slow down the vehicle to or below the limit vehicle speed VB. Then, the vehicle speed control unit causes the brake activator 26 to forcibly brake the vehicle 90 at step S10 so as to lower the vehicle speed VA below the limit vehicle speed VB before the curve 21, immediately after providing a warning through the warning means 28 at step S9. As a result, the vehicle can enter into the curve 21 at a lower than limit vehicle speed VB determined so that is corresponds to the curvature of radius R and road conditions Fd of the curve. The vehicle, therefore, passes safely through the curve 21.

The vehicle speed control system of the present invention may receive road information related to curves from tele-terminals and sign-posts in an automobile traffic information communication system, which has been put into practical use, rather than from the vehicle navigation system referred to above.

Figure 9:
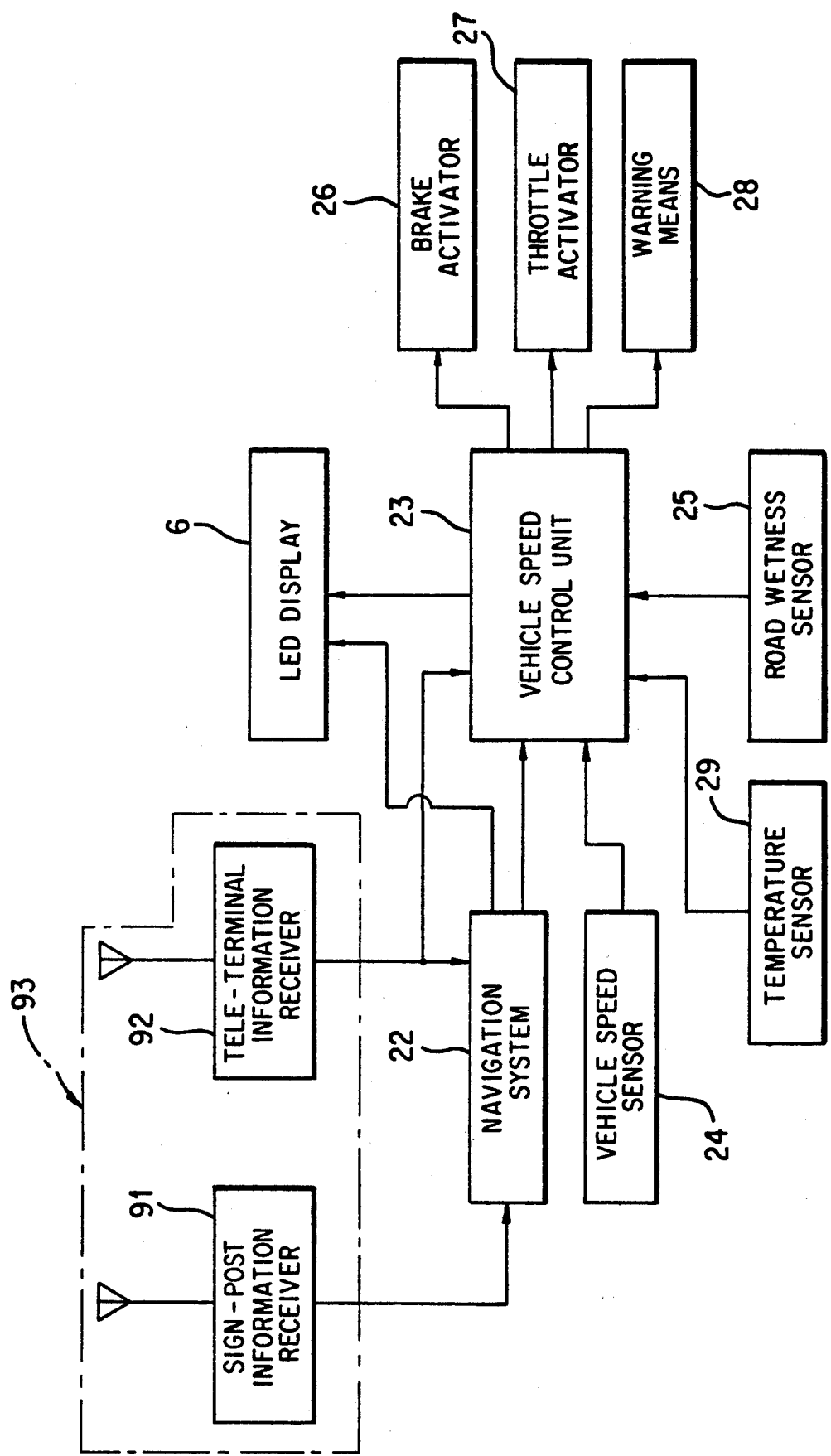
FIG. 9 is a block diagram showing a vehicle speed control system in accordance with another preferred embodiment of the invention.

Referring now to FIG. 9, the vehicle navigation system 22 is schematically shown as receiving road information through a traffic information receiving unit 93 having a tele-terminal information receiver 92 and a tele-post information receiver 91 through a tele-terminal and a sign-post of the automobile traffic information communication system. The road information includes, for instance, information related to accidents, traffic jams or congestion, traffic restrictions, road conditions, such as curvatures, snow fall, freezing, and so on. Such information is transmitted from a traffic control center through an information communication system connected to tele-terminals. The tele-terminal information receiver 92 receives road information related to roads in a specific circular area, defined by a radius of about 10 km, in which the vehicle is presently traveling, through a tele-terminal in the specific area and sends the road information to the vehicle control unit 23 for displaying it on a map displayed on the display screen 6. The sign-post information receiver 91 receives a location checking signal provided by a sign-post in the specific area so as to exactly correct a vehicle location on a displayed road map determined by the vehicle navigation system 2.

The vehicle speed control unit 23 specifies a vehicle location based on the exactly correct vehicle location on the road map. If the specified vehicle location is at a point A1 (shown in FIG. 8) in front of a sharp curve 21, the vehicle speed control unit 23 controls the vehicle speed VA so that it stays below a limit vehicle speed VB determined so as to correspond to road information related to the curve 21 received by the traffic information receiving unit 93 through the tele-terminal and sign-post of the automobile traffic information communication system in the same manner as described previously. As a result, the vehicle can negotiate and pass safely through the sharp curve 21 at a speed automatically lowered below the limit vehicle speed VB.

It is be understood that although the present invention has been described in detail with respect to preferred embodiments thereof, various other embodiments and variants may occur to those skilled in the art which fall within the scope and spirit of the invention. Any such other embodiments and variants are intended to be covered by the following claims.

What is claimed is:

1. A vehicle speed control system for a vehicle for use with a vehicle navigation system which indicates a location of the vehicle on a road map displayed on a screen as the vehicle travels and provides road information relating to curves, said vehicle speed control system comprising:

speed detecting means for detecting a speed of the vehicle;

vehicle speed control means for receiving information related to a curve in a road including at least the radius of curvature on which the vehicle is traveling when the vehicle navigation system indicates the vehicle is located at a predetermined location in front of said curve, calculating a limit vehicle speed, at which the vehicle can negotiate and pass safely through the curve, based on said speed of the vehicle detected by the speed detecting means and information related to said curve, comparing said speed of the vehicle with said limit vehicle speed, and responsive thereto causing at least one of a warning and deceleration of the vehicle to occur when said speed of the vehicle is higher than said limit vehicle speed.

2. A vehicle speed control system as recited in claim 1, wherein said vehicle speed control means automatically brakes the vehicle when said speed of the vehicle is higher than said limit vehicle speed.

3. A vehicle speed control system as recited in claim 1, wherein said vehicle speed control means automatically closes a throttle of the vehicle when said speed of the vehicle is higher than said limit vehicle speed.

4. A vehicle speed control system as recited in claim 1, wherein said information related to the curve in the road further includes frictional drag of said curve.

5. A vehicle speed control system as recited in claim 4, wherein said limit vehicle speed (VB) is calculated from the following equation:

$$VB = \sqrt{g \cdot R \cdot F}$$

wherein g is the gravitational acceleration;
R is the radius of curvature; and
F is the frictional drag of the road.

6. A vehicle speed control system as recited in claim 5, and further comprising road condition detecting means for detecting a wetness and a temperature of the road.

7. A vehicle speed control system as recited in claim 6, wherein said frictional drag of the road is determined based on a frictional drag, a temperature and a wetness of said curve.

8. A vehicle speed control system as recited in claim 1, wherein said vehicle has a vehicle location detector for receiving radio waves from a global positioning satellite so as to detect a present location of the vehicle.

9. A vehicle speed control system as recited in claim 1, wherein said vehicle has a vehicle location detector for detecting terrestrial magnetism of a place at which the vehicle is presently located and responsive thereto determining a present location of the vehicle.

10. A vehicle speed control system as recited in claim 1, wherein said vehicle has information receiving means for receiving road information from a tele-terminal of an automobile traffic information communication system in an area in which the vehicle is presently traveling and responsive thereto determining present location of the vehicle.

11. A vehicle speed control system as recited in claim 1, wherein said vehicle speed control means includes road condition detecting means for detecting road conditions which are taken into account in determining the limit vehicle speed.

12. A vehicle speed control system as recited in claim 11, wherein the road condition detecting means includes a temperature detector and a road wetness detector.

* * * * *